(12) United States Patent
Milligan et al.

(10) Patent No.: US 11,731,426 B2
(45) Date of Patent: Aug. 22, 2023

(54) FLUID FEED HOLE CORROSION DETECTION

(71) Applicant: Hewlett-Packard Development Company, L.P., Spring, TX (US)

(72) Inventors: Donald J. Milligan, Corvallis, OR (US); Eric T. Martin, Corvallis, OR (US); Rogelio Cicili, San Diego, CA (US)

(73) Assignee: Hewlett-Packard Development Company L.P., Spring, TX (US)

( * ) Notice: Subject to any disclaimer, the term of this patent is extended or adjusted under 35 U.S.C. 154(b) by 92 days.

(21) Appl. No.: 17/311,523

(22) PCT Filed: Jun. 18, 2019

(86) PCT No.: PCT/US2019/037615
§ 371 (c)(1),
(2) Date: Jun. 7, 2021

(87) PCT Pub. No.: WO2020/256694
PCT Pub. Date: Dec. 24, 2020

(65) Prior Publication Data
US 2022/0097369 A1    Mar. 31, 2022

(51) Int. Cl.
*B41J 2/175*     (2006.01)
*B41J 2/14*      (2006.01)
*G01N 17/00*     (2006.01)

(52) U.S. Cl.
CPC .......... *B41J 2/14153* (2013.01); *B41J 2/175* (2013.01); *G01N 17/008* (2013.01)

(58) Field of Classification Search
CPC ....... B41J 2/175; B41J 2/14153; G01N 17/00; G01N 17/008
See application file for complete search history.

(56) References Cited

U.S. PATENT DOCUMENTS

| | | | |
|---|---|---|---|
| 6,946,855 B1 | 9/2005 | Hemblade | |
| 7,188,935 B2 | 3/2007 | Silverbrook | |
| 7,517,055 B2 | 4/2009 | Silverbrook | |
| 7,850,285 B2* | 12/2010 | Yoshihira | B41J 2/17536 347/65 |
| 8,173,030 B2 | 5/2012 | Lebens et al. | |
| 8,173,032 B2 | 5/2012 | Barnes et al. | |
| 8,757,779 B2 | 6/2014 | Fielder et al. | |
| 8,771,528 B2 | 7/2014 | Sasaki et al. | |
| 8,840,981 B2 | 9/2014 | Sieber | |
| 9,597,873 B2* | 3/2017 | Rivas | B41J 2/1629 |
| 2002/0033042 A1 | 3/2002 | Brooker et al. | |
| 2004/0113983 A1 | 6/2004 | Silverbrook | |

(Continued)

FOREIGN PATENT DOCUMENTS

| CN | 100514021 C | 7/2009 |
|---|---|---|
| CN | 102574399 B | 8/2015 |

(Continued)

*Primary Examiner* — Anh T Vo
(74) *Attorney, Agent, or Firm* — Foley & Lardner LLP

(57) ABSTRACT

In various examples, a fluid ejection device may include a substrate with a fluid feed hole and a corrosion-detecting conductive path or sensor disposed behind a wall of the fluid feed hold. The corrosion-detecting conductive path or sensor may close a circuit in response being exposed to a fluid contained within the fluid feed hole.

15 Claims, 11 Drawing Sheets

(56) References Cited

U.S. PATENT DOCUMENTS

| | | |
|---|---|---|
| 2004/0182513 A1 | 9/2004 | Barnes et al. |
| 2005/0093932 A1 | 5/2005 | Silverbrook |
| 2009/0058897 A1 | 3/2009 | Han et al. |
| 2013/0083126 A1 | 4/2013 | Dokyi et al. |
| 2017/0072692 A1 | 3/2017 | Chen et al. |

FOREIGN PATENT DOCUMENTS

| | | |
|---|---|---|
| EP | 1559552 A2 | 8/2005 |
| JP | 4886497 B2 | 2/2012 |
| WO | WO-2011148131 A2 | 12/2011 |

* cited by examiner

FLUID FEED HOLE CORROSION DETECTION

BACKGROUND

Many fluid ejection devices such as ink jet printers include fluid feed "slots" that fluidically couple a fluid reservoir with a plurality of fluid ejection actuators, nozzles, and/or fluidic pumps (collectively referred to as "fluid ejection elements"). This effectively creates a one-to-many relationship between a fluid feed slot and multiple fluid ejection elements. However, some more recent fluid ejection devices include a plurality of fluid feed "holes" that fluidically couple a fluid reservoir with a plurality of fluid ejection elements. Fluid feed holes tend to be much smaller than fluid feed slots, making it more difficult to deposit protective material on, or to provide protective margin around, fluid feed holes. Consequently, fluid feed holes are more susceptible than fluid feed slots to corrosion, or "over-etching," caused by fluid.

BRIEF DESCRIPTION OF THE DRAWINGS

Features of the present disclosure are illustrated by way of example and not limited in the following figure(s), in which like numerals indicate like elements.

FIG. 3A depicts a conductive path, while FIG. 3B depicts an etched fluid feed hole, exposing the conductive path of FIG. 3A to the fluid.

FIG. 4A depicts a conductive path, while FIG. 4B depicts an etched fluid feed hole, exposing the conductive path of FIG. 4A to the fluid.

FIG. 9A depicts a circular conductive path; FIG. 9B depicts a square conductive path; and FIG. 9C depicts a conductive path partially surrounding a fluid feed hole.

FIG. 10A depicts a fluidic die with on-die circuitry; FIG. 10B depicts a fluidic die with off-die circuitry.

DETAILED DESCRIPTION

Figure 1:
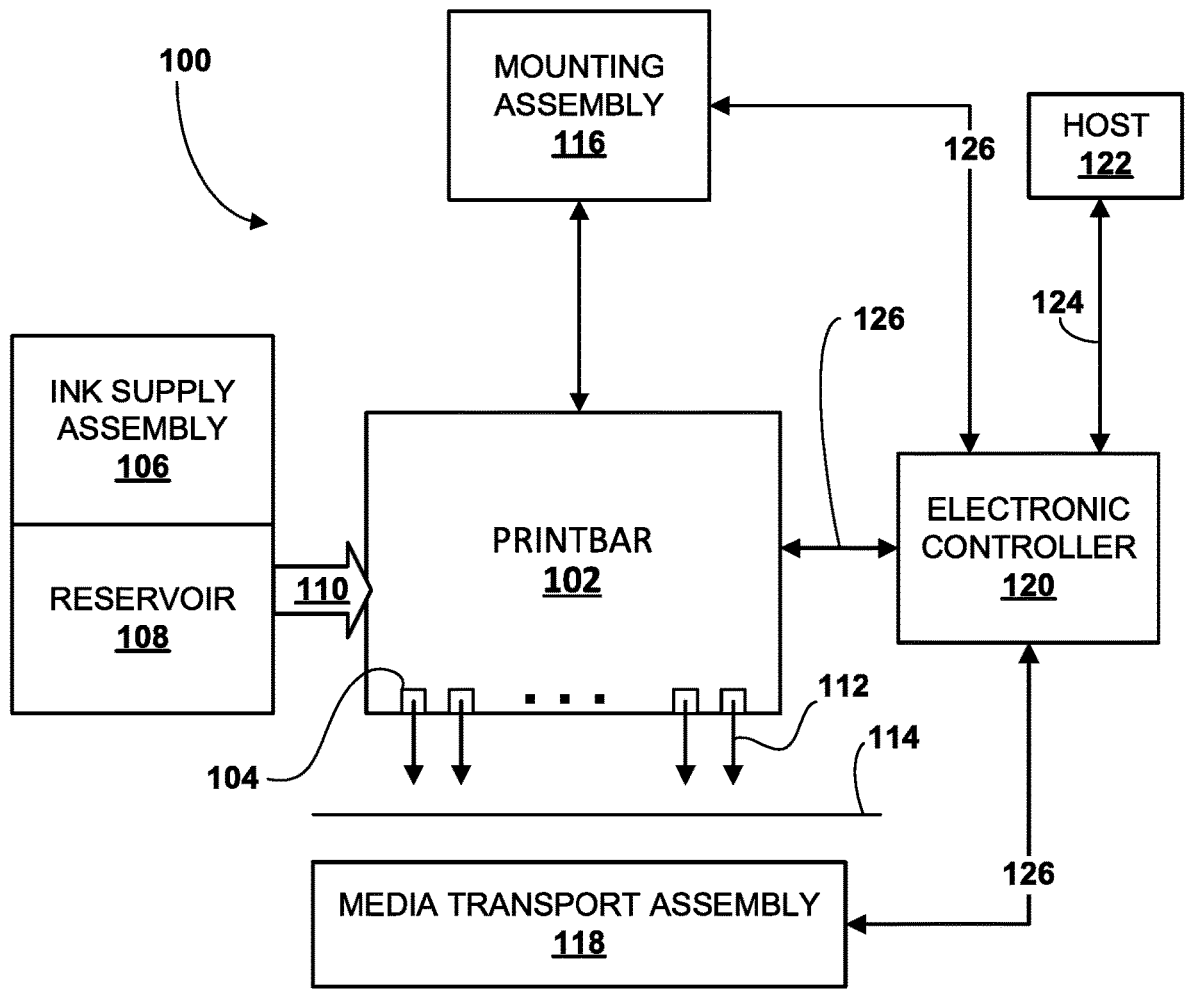
FIG. 1 is a block diagram of an example of a fluid ejection system that may be used to form images using fluid ejection devices.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, it should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Techniques, apparatus, and systems are described herein for monitoring and/or detecting corrosion, or "over-etching," of material in which fluid feed holes are manufactured. Examples described herein may be applicable, for instance, with ink jet printheads and/or printhead dice used for two-dimensional and/or three-dimensional printing. As an example, a sensor taking the form of a conductive path may be disposed behind a wall of a fluid feed hole to detect over-etching. Such a conductive path may take various forms, such as a diode, resistor, conductor, or buried implant layer. As the fluid feed hole(s) is etched or corroded by fluid, the conductive path is eventually exposed to the fluid (e.g. ink). In some examples this creates electrical coupling between the conductive path and the fluid, effectively closing a circuit. The closure of this circuit can be detected using various types of logic and/or sensing circuitry. In some examples, the conductive path may be formed as an implant layer, which may allow for increased implant depth (resulting in increased contact with ink) and conductivity as compared to, for instance, a deposited thin film layer. However, in some instances, a deposited thin film layer may also be used for the conductive path.

A number of examples for the structure of the conductive path are contemplated herein. In one example, the conductive path is electrically coupled to an analog-to-digital converter ("A/D") that is disposed on a fluidic die, such as a silicon fluid ejection die. In some such examples, an "over-etch status" signal generated by the conductive path can be digitized on-die and then communicated to off-die logic (see FIG. 10A), such as sensing circuitry of a printing system. In some examples, the on-die A/D may be already be present on the die, e.g., for thermal control or other sensing functions, and may be re-purposed for over-etch detection as described herein. In other instances, the analog signal generated by exposure of the conductive path may be routed off die, e.g., by way of a bond pad or electrical connection that is coupled to external sense circuitry (see FIG. 10B).

As used herein, the term "etch" or "etching" is used to refer to the degradation or corrosion of the substrate, for example silicon, as a result of extended exposure of the substrate to a fluid, such as ink. Furthermore, as used herein, the term "over-etch" or "over-etching" is used to refer to advanced degradation or corrosion of the substrate that may affect the structural integrity or functional ability of the substrate to a degree that an intervention may be warranted.

FIG. 1 is a block diagram of an example of an ink jet printing system 100 that may be used to form images using ink jet printheads. The ink jet printing system 100 includes a printbar 102, which includes a number of printheads 104, and an ink supply assembly 106. The ink supply assembly 106 includes an ink reservoir 108. From the ink reservoir 108, ink 110 is provided to the printbar 102 to be fed to the printheads 104. The ink supply assembly 106 and printbar 102 may use a one-way ink delivery system or a recirculating ink delivery system. In a one-way ink delivery system, substantially all of the ink supplied to the printbar 102 is consumed during printing. In a recirculating ink delivery system, a portion of the ink 110 supplied to the printbar 102 is consumed during printing, and another portion of the ink is returned to ink supply assembly. In an example, the ink supply assembly 106 is separate from the printbar 102, and supplies the ink 110 to the printbar 102 through a tubular connection, such as a supply tube (not shown). In other examples, the printbar 102 may include the ink supply assembly 106, and ink reservoir 108, along with a printhead 104, for example, in single user printers. In either example, the ink reservoir 108 of the ink supply assembly 106 may be removed and replaced, or refilled.

From the printheads 104 the ink 110 is ejected from nozzles as ink droplets 112 towards a print medium 114, such as paper, Mylar, cardstock, and the like. The nozzles of the printheads 104 are arranged in columns or arrays such that properly sequenced ejection of ink 110 can form characters, symbols, graphics, or other images to be printed on the print medium 114 as the printbar 102 and print medium 114 are moved relative to each other. The ink 110 is not limited to colored liquids used to form visible images on a print medium, for example, the ink 110 may be an electroactive substance used to print circuit patterns, such as solar cells.

A mounting structure or assembly 116 may be used to position the printbar 102 relative to the print medium 114. In an example, the mounting assembly 116 may be in a fixed position, holding a number of printheads 104 above the print medium 114. In another example, the mounting assembly 116 may include a motor that moves the printbar 102 back and forth across the print medium 114, for example, if the printbar 102 included one to four printheads 104. A media transport assembly 118 moves the print medium 114 relative to the printbar, for example, moving the print medium 114 perpendicular to the printbar 102. In some examples, the media transport assembly 118 may include rolls, including any number of motorized pinch rolls used to pull the print medium through the printing systems. If the printbar 102 is moved, the media transport assembly 118 may index the print medium 114 to new positions. In examples in which the printbar 102 is not moved, the motion of the print medium 114 may be continuous.

A controller 120 receives data from a host system 122, such as a computer. The data may be transmitted over a network connection 124, which may be an electrical connection, an optical fiber connection, or a wireless connection, among others. The data transmitted over network connection 124 may include a document or file to be printed, or may include more elemental items, such as a color plane of a document or a rasterized document. The controller 120 may temporarily store the data in a local memory for analysis. The analysis may include determining timing control for the ejection of ink drops from the printheads 104, as well as the motion of the print medium 114 and any motion of the printbar 102. The controller 120 may operate the individual parts of the printing system over control lines 126. Accordingly, the controller 120 defines a pattern of ejected ink drops 112, which form characters, symbols, graphics, or other images on the print medium 114.

The ink jet printing system 100 is not limited to the items shown in FIG. 1. For example, the controller 120 may be a cluster computing system coupled in a network that has separate computing controls for individual parts of the system. For example, a separate controller may be associated with each of the mounting assembly 116, the printbar 102, the ink supply assembly 106, and the media transport assembly 118. In this example, the control lines 126 may be network connections coupling the separate controllers into a single network. In other example, the mounting assembly 116 may not be a separate item from the printbar 102, for example, if no motion is needed by the printbar 102.

Figure 2:
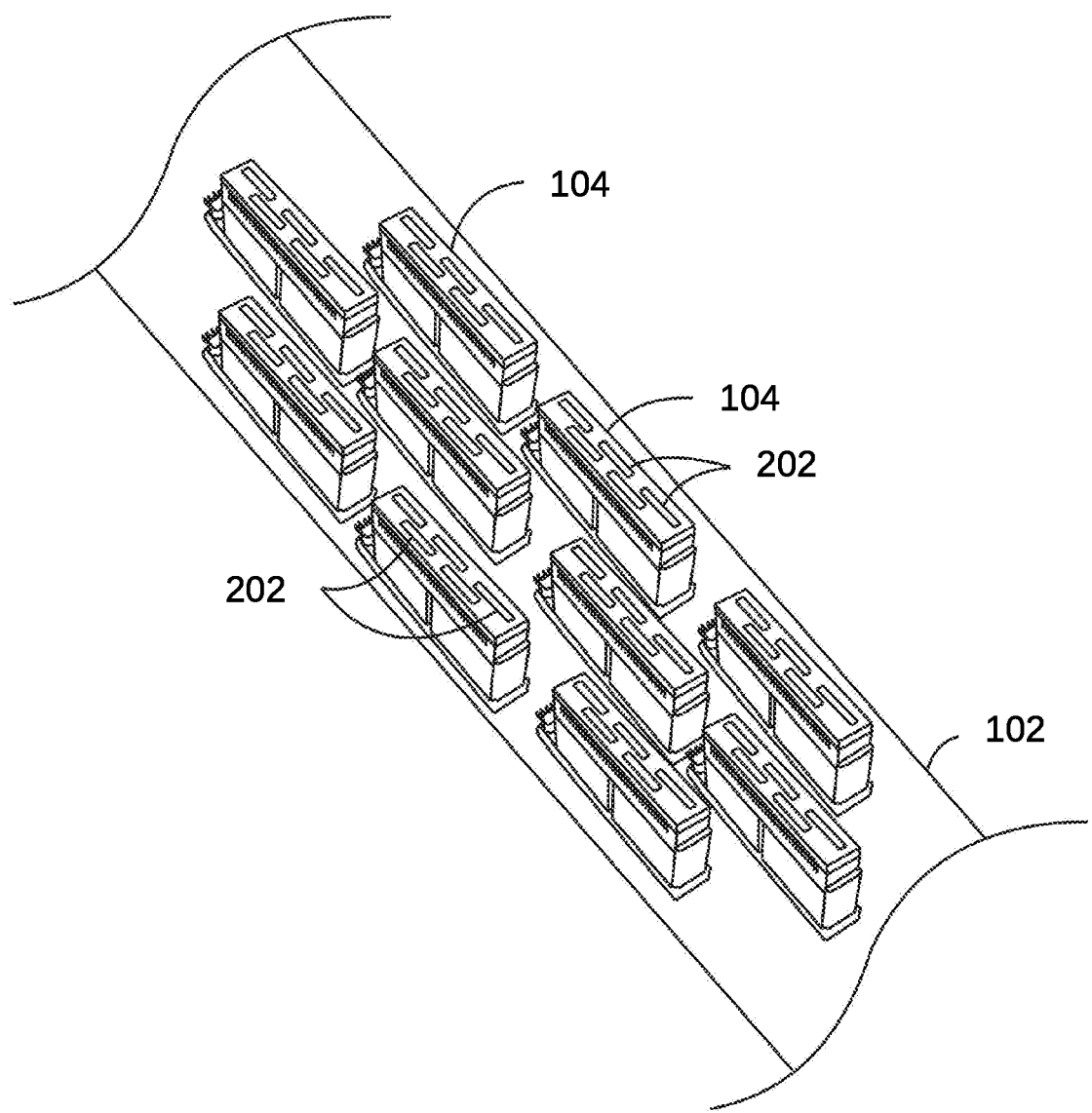
FIG. 2 is a drawing of a cluster of fluid ejection devices in the form of ink jet printheads in an example print configuration, for example, in a printbar.

FIG. 2 is a drawing of a cluster of ink jet printheads 104 in an example print configuration, for example, in a printbar 102. Like numbered items are as described with respect to FIG. 1. The printbar 102 shown in FIG. 2 may be used in configurations that do not move the printhead. Accordingly, the printheads 104 may be attached to the printbar 102 in an overlapping configuration to give complete coverage. Each printhead 104 has multiple nozzle regions 202 that have the nozzles and circuitry used to eject ink droplets. In some cases, nozzle regions 202 may take the form of silicon-based fluidic dice as described herein.

Figure 3A:
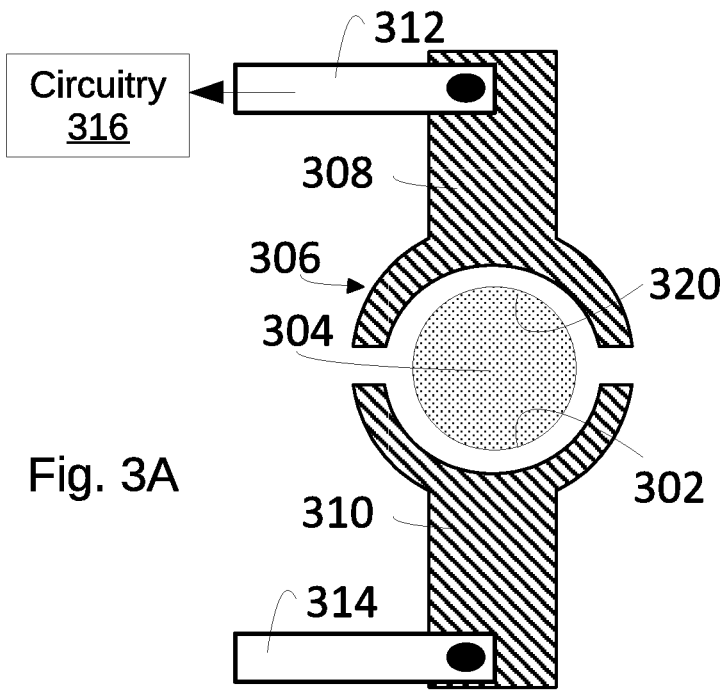
FIGS. 3A-B depict an example of how a fluid ejection device configured with selected aspects of the present disclosure may be assembled.
Figure 3B:
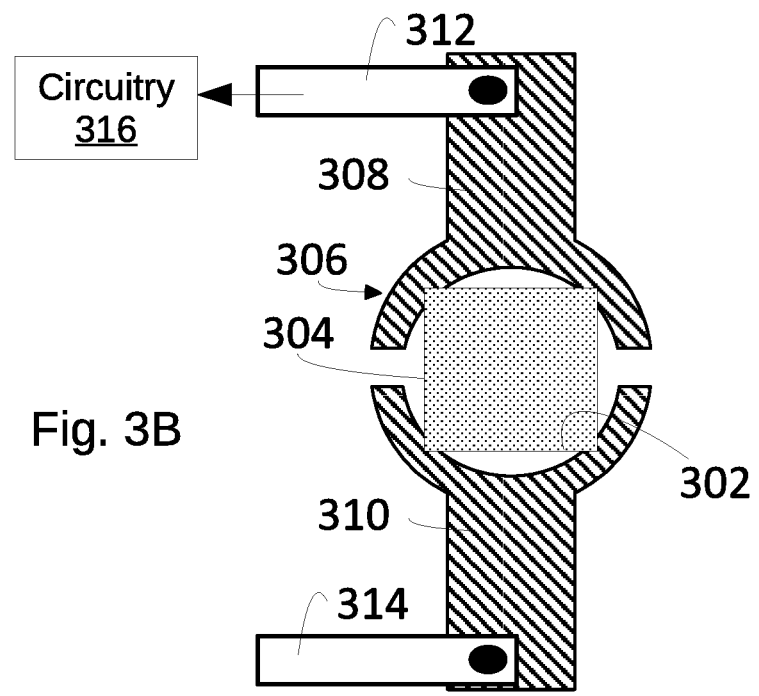

FIGS. 3A-B depict a fluid feed hole 302 formed in a substrate that may correspond to, for instance, nozzle regions 202 or fluidic dice described with reference to previous figures. In some instances, this substrate may be a silicon-based fluidic die. As discussed previously herein, a fluid feed hole 302 may be smaller than a fluid feed slot, and resultantly may be more susceptible to over-etching caused by fluid 304 (see FIG. 3B). Therefore, a sensor such as a corrosion-detecting conductive path 306 may be disposed behind a wall 320 of the fluid feed hole 302, such that when the corrosion-detecting conductive path 306 is exposed to the fluid 304 a circuit is closed. In some instances, the corrosion-detecting conductive path 306 may include an implant layer of the silicon forming the substrate. In some instances, the implant layer may be desirable for its maximum implant depth, which may result in more contact with the fluid (when etched) and thus increased conductivity. In other instances, the corrosion-detecting conductive path 306 may include a thin film layer (e.g. metal) deposited in the substrate.

As depicted in FIGS. 3A-B, the corrosion-detecting conductive path 306 may include two electrically-isolated portions 308, 310. A first of the electrically-isolated portions 308 may be coupled via element 312 to a voltage source. In some instances, the voltage source may be circuitry 316 disposed either on-die or off-die (see FIGS. 10A-B). A second of the electrically-isolated portions 310 may be coupled to ground 314. These two electrically-isolated portions 308, 310 may be arranged so as to couple via the fluid 304 in response to the corrosion or etching of the wall 320 of the fluid feed hole 302 (see FIG. 3B). In some instances, the corrosion or etching of each plane of the substrate may occur at a non-uniform rate. As a result, a round fluid feed hole 302 (as illustrated herein) may corrode or etch to become more rectangular in shape (see FIG. 3B). Once the fluid feed hole has corroded or etched so that electrical contact is made, via fluid 304, between the two electrically-isolated portions 308, 310, a circuit that includes corrosion-detecting conductive path 306 may be closed.

In some examples, circuitry 316 may apply voltage to the first electrically-isolated portion 308 of the corrosion-detecting conductive path 306. This circuitry 316 may also, in some instances, receive a return current or measure the resulting current. For example, a return current may indicate that a circuit has closed in response to exposure of the corrosion-detecting conductive path 306 to a fluid 304 in the fluid feed hole 302. Furthermore, in some instances, this circuitry 316 may also be operatively coupled to a controller (1090, FIG. 10) that interacts with the circuitry 316 in order to apply the voltage.

Figure 4A:
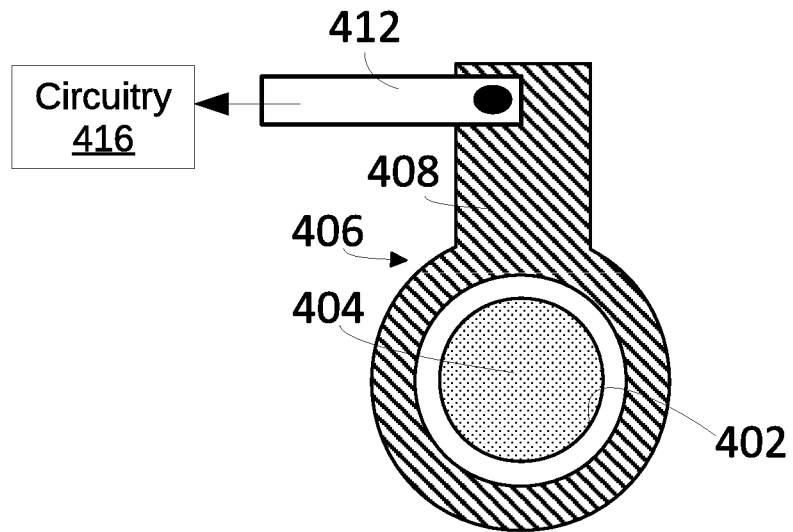
FIGS. 4A-B depict another example of how a fluid ejection device configured with selected aspects of the present disclosure may be assembled.
Figure 4B:
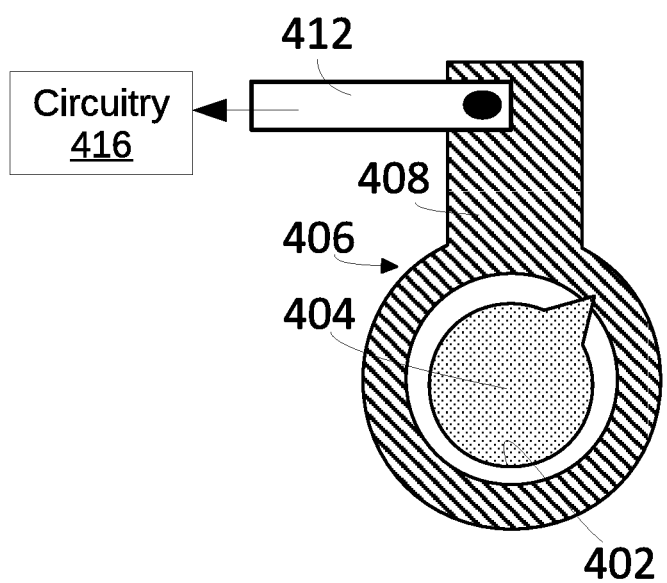

In some instances, such as illustrated in FIGS. 4A-B, there may not be a separate electrically-isolated portion coupled to ground, as illustrated in FIGS. 3A-B. In such instances, the corrosion-detecting conductive path 406 may include one electrically-isolated portion 408 that may be coupled via element 412 to a voltage source such as circuitry 416. In such instances, the fluid 404 itself (for example, ink), may be grounded, and thus serve as the ground. In such an instance, even asymmetrical etching of a fluid feed hole 402, such as illustrated in FIG. 4B, may allow for a circuit formed with corrosion-detecting conductive path 406 to be closed.

Figure 5:
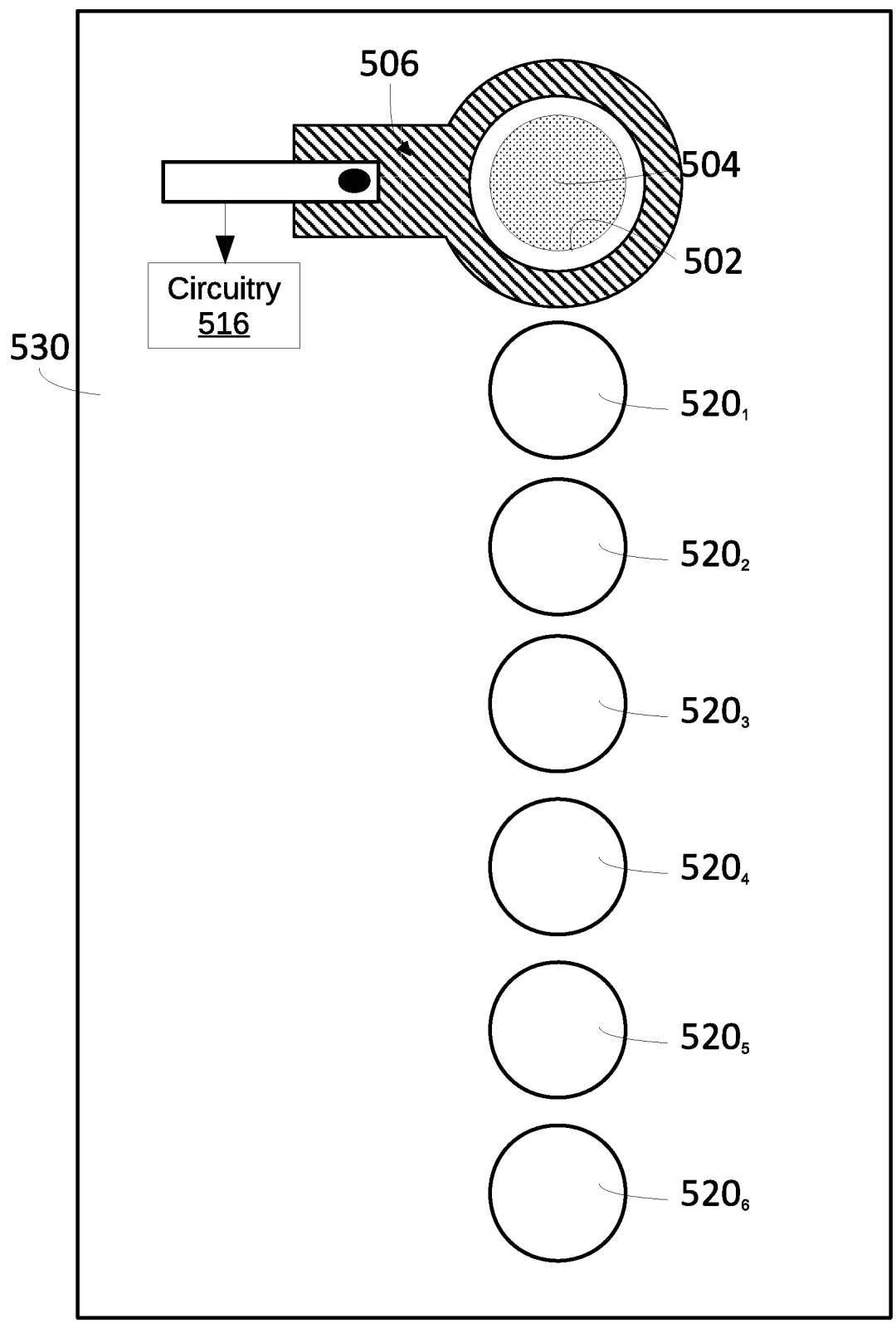
FIG. 5 depicts an example of how a fluid ejection device configured with selected aspects of the present disclosure may be assembled with a representative fluid feed hole.

There may be instances where the region of a fluidic die containing fluid feed holes may be congested and the additional circuitry for a corrosion-detecting conductive path such as described with reference to FIGS. 3A-B and 4A-B may be more difficult to achieve. In such instances, such as illustrated in FIG. 5, a representative or "proxy" fluid feed hole 502 may be used. In some instances, the representative fluid feed hole 502 may be placed on a region of a fluidic die 530 falling outside an array of functional fluid feed holes $520_{1-n}$, but still in contact with the fluid 504. However, in other instances, the representative fluid feed hole 502 may be among the array of functional fluid feed holes $520_{1-n}$. Regardless of the placement of the representative fluid feed hole 502, the corresponding corrosion-detecting conductive path 506 and associated circuitry 516 may function as a diagnostic fluid feed hole, allowing for the detection of over-etching without the additional circuitry proximate each functional fluid feed hole 520.

Figure 6:
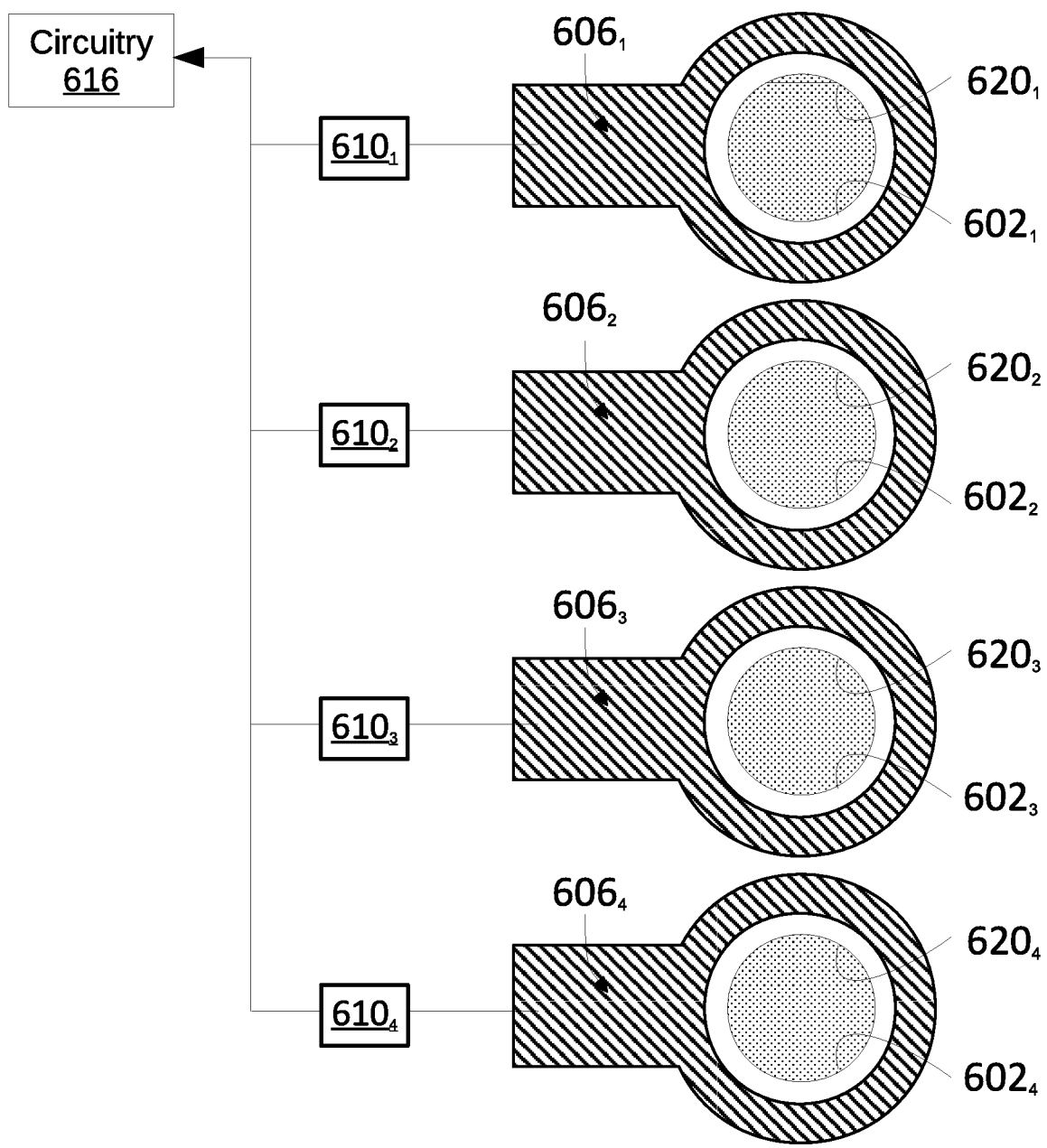
FIG. 6 depicts an example of how a fluid ejection device configured with selected aspects of the present disclosure may be assembled with an individually-addressable switch operably coupled with a conductive path.
Figure 7:
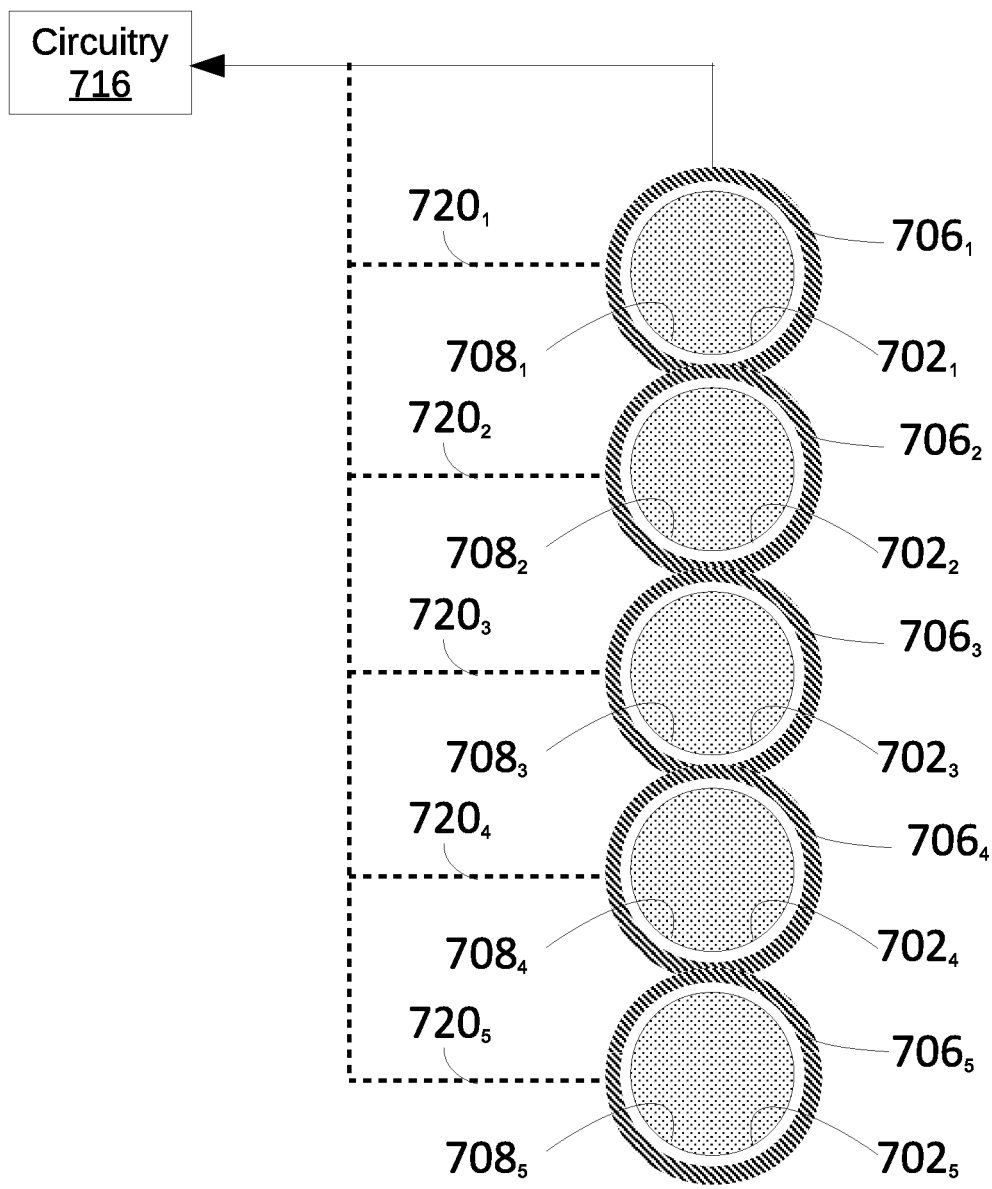
FIG. 7 depicts an example of how a fluid ejection device configured with selected aspects of the present disclosure may be assembled with multiple conductive paths in contact with each other.
Figure 8:
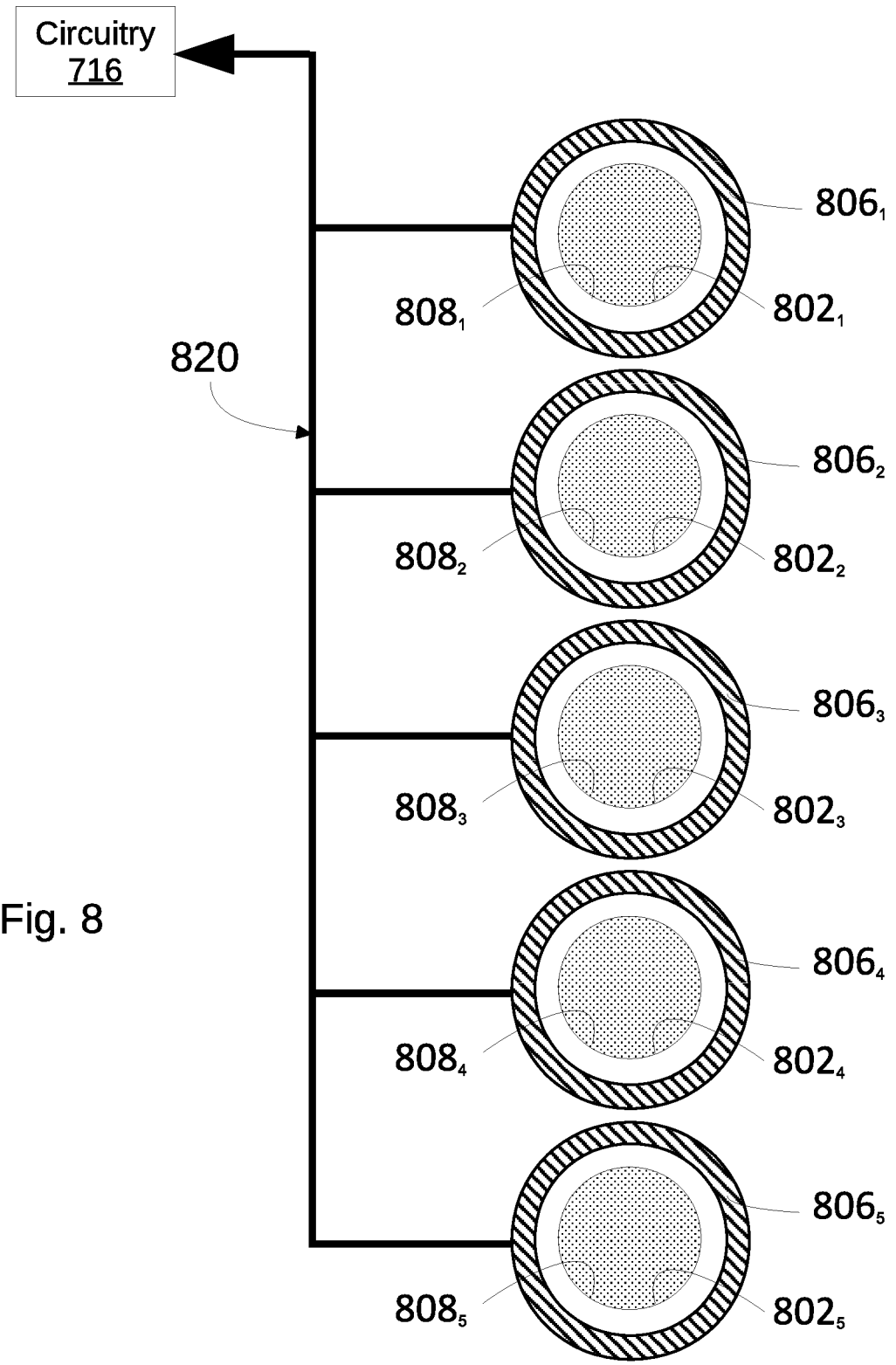
FIG. 8 depicts an example of how a fluid ejection device configured with selected aspects of the present disclosure may be assembled with multiple conductive paths spatially separated on the substrate and connected by a low-resistance interconnect layer.

In some instances, for example as illustrated in FIGS. 6-8, there may be a plurality of fluid feed holes, $602_{1-n}$, $702_{1-n}$, $802_{1-n}$ on a fluidic die. In the example of FIG. 6, for instance, a plurality of fluid feed holes $602_{1-n}$ includes corresponding corrosion-detecting conductive paths $606_{1-n}$ disposed behind a wall $620_{1-n}$ of the respective fluid feed hole $602_{1-n}$. The plurality of fluid feed holes $602_{1-n}$ also include a corresponding plurality of individually-addressable switches $610_{1-n}$, which may take the form of a P-type metal-oxide-semiconductor ("PMOS") or N-type metal-oxide-semiconductor ("NMOS") field-effect transistors ("FET"). Each individually-addressable switch 610 is operatively coupled to a corresponding corrosion-detecting conductive path 606 and, ultimately, to circuitry 616.

The control of the individually-addressable switches $610_{1-n}$ may, as a non-limiting example, include a test mode, where the individually-addressable switches $610_{1-n}$ may be selected to perform an over-etch analysis by determining if a circuit that includes the corresponding corrosion-detecting conductive path 606 is closed. This enables individual fluid feed holes 602 to be tested for over-etching, and also allows more than one fluid feed hole $602_{1-n}$ to be tested or analyzed for over-etching in parallel. Furthermore, in some instances, since the switches $610_{1-n}$ are individually-addressable, a region or location of any detected over-etching may be determinable, which may be useful for diagnostic purposes. As an example, the controller (1090, FIG. 10) may transmit an address associated with the fluid feed hole $602_4$ through the circuitry 616, so that the address may be used to distinguish fluid feed hole $602_4$ from other fluid feel holes (e.g., fluid feed holes $602_{1-3}$) on the fluidic die.

Figure 10A:
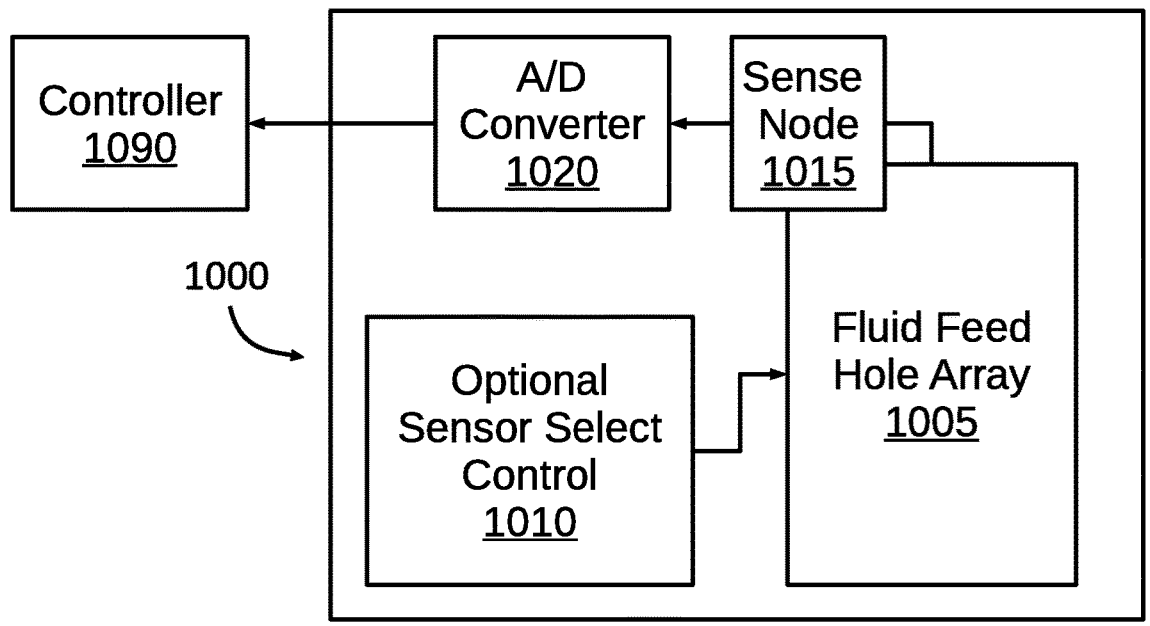
FIGS. 10A-B depict example fluidic dice.
Figure 10B:
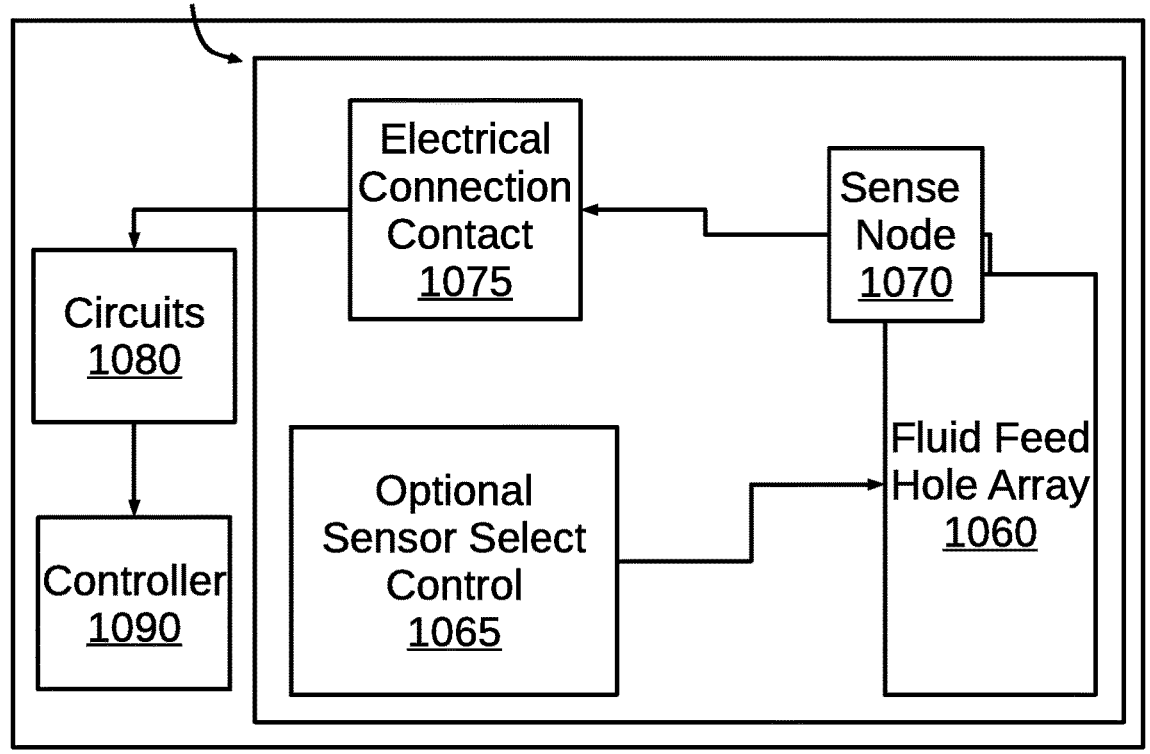

Similar to previous examples, the circuitry 616 may, in some instances, be located on the on-die (see generally FIG. 10A); while in other instances the circuitry 616 may be located off-die and measured through an electrical connection contact pad (see generally FIG. 10B). In such instances, the electrical connection contact 1075 could be used for multiple purposes, including but not limited to, networking the switches $610_{1-n}$ to multiplex the switches on the die to the electrical connection contact 1075.

In other examples, individual fluid feed holes may not be individually analyzable. Referring specifically to FIG. 7, a plurality of fluid feed holes $702_{1-n}$ includes a corresponding plurality of corrosion-detecting conductive paths $706_{1-n}$ disposed behind walls $708_{1-n}$ of the fluid feed holes $702_{1-n}$. However, rather than being spatially-separated as illustrated in FIG. 6, in FIG. 7, corrosion-detecting conductive paths $606_{1-4}$ are in physical or "galvanic" contact with each other. For example, a first corrosion-detecting conductive path $706_1$ of a first fluid feed hole $702_1$ is physically in contact with a second corrosion-detecting conductive path $706_2$ of a proximate neighbor (e.g. a second fluid feed hole $702_2$).

In FIG. 7, one end of an array formed of the physically-touching corrosion-detecting conductive paths $706_{1-4}$ is connected to circuitry 716. Circuitry 716 may share various characteristics with previous instances of circuitry (e.g., 316, 416, 516, 616). In some examples in which there is sufficient space on the fluidic die, low-impedance connections $720_{1-n}$ (dashed lines) may be provided to connect individual corrosion-detecting conductive paths 706 to other locations of the array. Contact of a corrosion-detecting conductive paths 706 with a neighboring corrosion-detecting conductive path 706 may allow for parallel analysis of over-etching, such an all fluid-feed holes $702_{1-n}$ may be analyzed for over-etching simultaneously. Consequently, a controller (1090, FIG. 10) may be able to determine the number (or a count) of the over-etched fluid feed holes (i.e. the corrosion-detecting conductive paths exposed to fluid) based on the magnitude of the returned current. For example, a greater returned current may indicate that more fluid feed holes are over-etched, as compared to when a lower current is returned. Moreover, with multiple fluid feed holes $702_{1-n}$ being analyzed for over-etching in parallel, a larger (more detectable) signal for over-etching may be present, especially if multiple fluid feed holes $702_{1-n}$ have been over-etched.

Referring now to FIG. 8, a plurality of fluid feed holes $802_{1-n}$ once again includes a corresponding plurality of corrosion-detecting conductive path $806_{1-n}$ disposed behind a wall $808_{1-n}$ of the respective fluid feed hole. However, unlike in FIG. 7, in FIG. 8, the corrosion-detecting conductive paths $806_{1-n}$ are spatially separated from each other. As illustrated in FIG. 8, in some instances, a low-resistance interconnect layer 820 may connect the spatially-separated corrosion-detecting conductive paths $806_{1-n}$. In some instances, the low-resistance interconnect layer 820 may be a thin-film metal. Due to the relatively low resistance imposed by low-resistance interconnect layer 820, over-etching of the fluid feed holes $802_{1-n}$ may be more easily detected than in other examples in which a greater resistance is present between the corrosion-detecting conductive paths. And as was the case in the example of FIG. 7, in this example, a greater returned current may indicate a greater number of over-etched fluid feed holes 802. As with previous examples, the circuitry 816 may share various characteristics with previous instances such circuitry, such as 316, 416, 516, 616, 716).

Figure 9A:
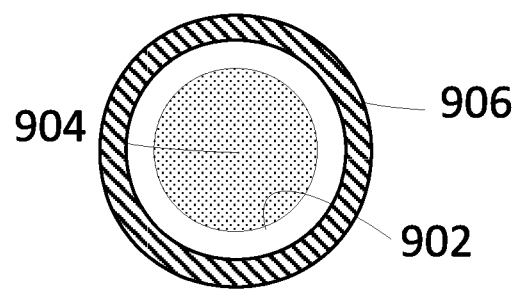
FIGS. 9A-C depict various conductive paths.
Figure 9B:
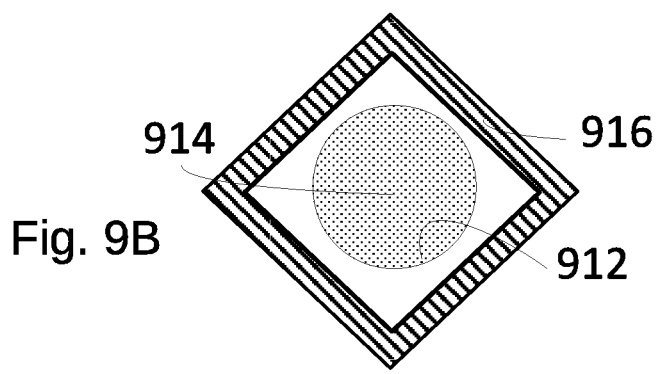
Figure 9C:
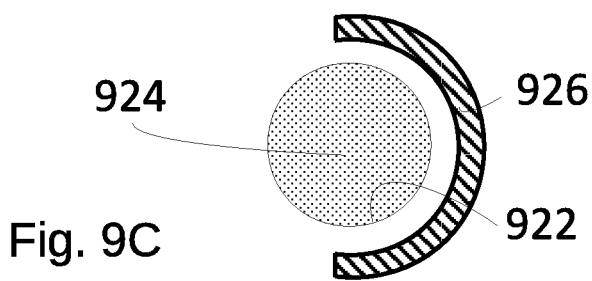

In previous examples, corrosion-detecting conductive paths were illustrated primarily as extending concentrically about the entire perimeter of the fluid feed hole. However, this is not meant to be limiting. The corrosion-detecting conductive path be any shape capable of closing a circuit in response to exposure to the fluid contained within the fluid feed hole. FIGS. 9A-C illustrate various conductive paths having various shapes. FIG. 9A illustrates a corrosion-detecting conductive path 906 that extends concentrically about the entire perimeter of the fluid feed hole 902. FIG. 9B illustrates a corrosion-detecting conductive path 916 that extends about the entire perimeter of the fluid feed hole 912 in the form of a square, such that the distance from the fluid feed hole 912 and the corrosion-detecting conductive path 916 may vary. FIG. 9C illustrates a corrosion-detecting conductive path 926 that extends partially about the entire perimeter of the fluid feed hole 922, for example in the form of a half circle. Regardless of the structure, when the corrosion-detecting conductive path 906, 916, 926 is exposed to the fluid 904, 914, 924 of the fluid feed hole 902, 912, 922 a circuit is closed.

As mentioned previously, the circuitry (e.g., 216, 316, 416, 516, 616, 716, 816) connected to the corrosion-detecting conductive path(s) may be either on a fluidic die 1000 (FIG. 10A) or off the fluidic die 1055 (FIG. 10B). Referring now to FIG. 10A, the fluid feed holes may be contained in a fluid feed hole array 1005 region of fluidic die 1000. A sense node 1015 of the fluid feed hole array 1005 may be coupled to an on-die analog-to-digital (A/D) converter 1020. The signal from the corrosion-detecting conductive path(s) may be digitized by the A/D converter 1020 to allow the fluidic die 1000 to digitally communicate an over-etch status to a controller 1090 for the system. In some instances, the on-die A/D converter 1020 may be already be present on the fluidic die for other functions (i.e. thermal control or other sensing functions) and may be re-purposed for over-etch detection.

Similar to the example illustrated in FIG. 10A, the example illustrated in FIG. 10B may also include fluid feed holes contained within a fluid feed hole array 1060 region of the fluidic die 1055. However, the example illustrated in FIG. 10B includes off-die circuitry 1080, which in some instances, may allow for more advanced processing. A sense node 1070 of the fluid feed hole array 1060 may be coupled to an electrical connection contact 1075, which may also be known as a launch pad or a sense pad. This electrical connection contact 1075 may be coupled to external, off-die circuitry 1080 that is a part of the system 1050. In some instances, the electrical connection contact 1075 may be used for other sensing functions as well.

Regardless of whether the circuitry is disposed on the fluidic die or off the fluidic die, the system may, through a controller 1090, request information regarding over-etching. If over-etching is detected—e.g. a corrosion-detecting conductive path is exposed to the fluid—the fluidic die 1000, 1055 may effectively inform the system that an intervention is needed (for example replacing the print head).

In some instances, such as illustrated in FIG. 6, each of the fluid feed holes may include an individually-addressable switch (e.g. PMOS or NMOS FETs), each of which is operatively coupled to each corresponding corrosion-detecting conductive path and ultimately to circuitry. In such instances, the fluidic die 1000, 1055 may additionally, optionally, include a sensor select control 1010, 1065 that may control the individually-addressable switches in order to select a sensor to monitor for over-etching.

Figure 11:
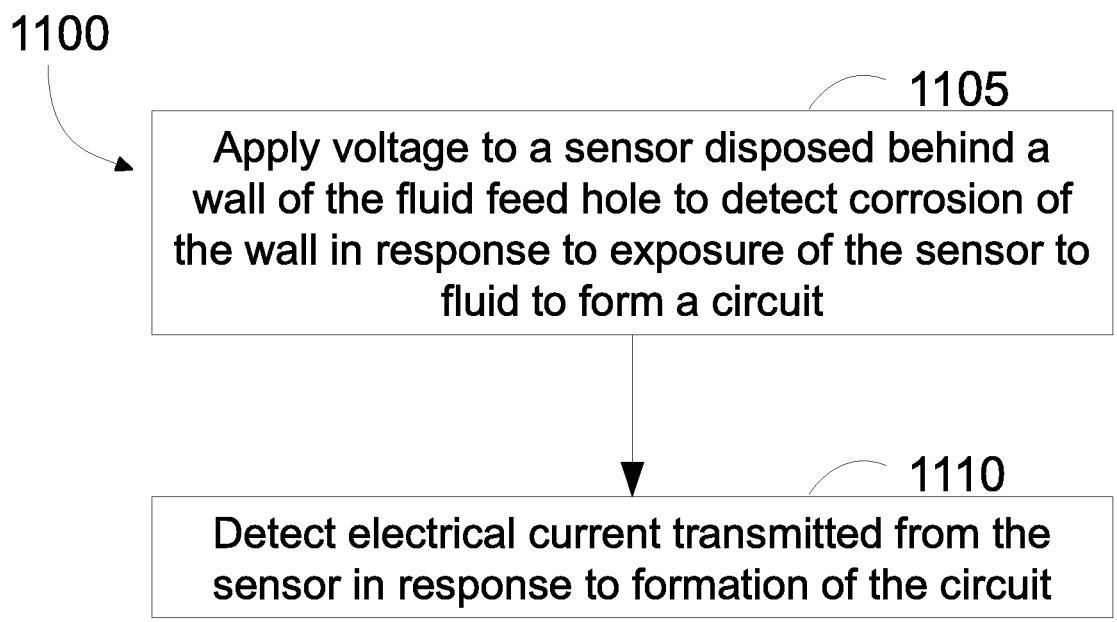
FIG. 11 depicts an example method of detecting over-etching of a fluid ejection device configured with selected aspects of the present disclosure.

FIG. 11 illustrates a flowchart of an example method 1100 for detecting over-etching of a fluid ejection device in accordance with the present disclosure. It is to be understood that, in some instances, the method may include additional operations than those illustrated in FIG. 11, may perform operations of FIG. 11 in a different order and/or in parallel, and/or may omit various operations of FIG. 11.

At block 1105, a voltage may be applied to a sensor disposed behind a wall of a fluid feed hole. This voltage may allow for the detection of corrosion of the wall of the fluid feed hole, as when the wall is corroded, or over-etched, the sensor may come into contact with the fluid contained within the fluid feed hole and form a circuit as described previously. This voltage may be applied, for example, through a controller (e.g., 1090) interacting with circuitry (either on the fluidic die or off). The sensor may be any of the examples of a corrosion-detecting conductive paths described herein with reference to FIGS. 3-9.

At block 1110, an electrical current may be returned from the sensor in response to the formation of a circuit due to the fluid contact with the sensor. In some instances, the presence and/or magnitude of this electrical current may be indicative of an over-etch status of fluid feed hole(s).

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. A fluid ejection device, comprising:
    a substrate that includes a fluid feed hole; and
    a corrosion-detecting conductive path disposed behind a wall of the fluid feed hole;
    wherein the corrosion-detecting conductive path is to close a circuit in response to exposure of the corrosion-detecting conductive path to a fluid.

2. The fluid ejection device of claim 1, wherein the corrosion-detecting conductive path comprises two electrically-isolated portions, wherein a first of the electrically-isolated portions is coupled to a voltage source and a second of the electrically-isolated portions is coupled to ground, wherein the two electrically-isolated portions are arranged to couple the first and second electrically-isolated portions via the fluid in response to corrosion of the wall.

3. The fluid ejection device of claim 1, wherein the corrosion-detecting conductive path comprises an implant layer of silicon forming the substrate or a deposited thin film layer.

4. The fluid ejection device of claim 1, wherein the fluid feed hole is one of a plurality of fluid feed holes of the substrate, the corrosion-detecting conductive path is a first corrosion-detecting conductive path, and a second corrosion-detecting conductive path is disposed behind a wall of a second fluid feed hole of the plurality of fluid feed holes.

5. The fluid ejection device of claim 4, further comprising:
a first individually-addressable switch operably coupled to the first corrosion-detecting conductive path; and
a second individually-addressable switch operably coupled to the second corrosion-detecting conductive path.

6. The fluid ejection device of claim 4, wherein the first corrosion-detecting conductive path and the second corrosion-detecting conductive path are in electrical contact with each other.

7. The fluid ejection device of claim 4, wherein the first corrosion-detecting conductive path and the second corrosion-detecting conductive path spatially separated on the substrate and are connected by a low-resistance interconnect layer.

8. The fluid ejection device of claim 1, wherein the corrosion-detecting conductive path extends concentrically about an entire perimeter of the fluid feed hole.

9. The fluid ejection device of claim 1, wherein the corrosion-detecting conductive path extends partially about a perimeter of the fluid feed hole.

10. The fluid ejection device of claim 1, further comprising an analog-to-digital converter, operably coupled with the corrosion-detecting conductive path, to digitize a signal provided by the corrosion-detecting conductive path in response to the exposure to the fluid.

11. A fluid ejection system, comprising:
a controller; and
circuitry operably coupled with the controller;
wherein the controller is to interact with the circuitry to apply voltage to a corrosion-detecting conductive path proximate a fluid feed hole of a fluidic die installed in the fluid ejection system, and to receive a return current via the circuitry in response to exposure of the corrosion-detecting conductive path to a fluid in the fluid feed hole.

12. The fluid ejection system of claim 11, wherein the controller interacts with the circuitry to transmit an address associated with the fluid feed hole through the circuitry, wherein the address distinguishes the fluid feed hole from other fluid feel holes of a plurality of fluid feed holes of the fluidic die.

13. The fluid ejection system of claim 11, wherein fluid feed hole is one of a plurality of fluid feed holes that are proximate to a plurality of respective corrosion-detecting conductive paths, and the controller is to determine a count of the corrosion-detecting conductive paths exposed to fluid based on a magnitude of the return current.

14. A method of detecting over-etching of a fluid ejection device comprising a fluid feed hole, comprising:
applying voltage to a sensor disposed behind a wall of the fluid feed hole to detect corrosion of the wall in response to exposure of the sensor to fluid to form a circuit; and
detecting electrical current transmitted from the sensor in response to formation of the circuit.

15. The method of claim 14, wherein the detected electrical current is indicative of an over-etch status of the fluid feed hole.

* * * * *